June 30, 1925.

E. J. ARMSTRONG

EXCAVATING MACHINE

Filed June 14, 1924

1,544,054

2 Sheets-Sheet 1

Inventor
Edwin J. Armstrong
By
Attorney

June 30, 1925.

E. J. ARMSTRONG 1,544,054

EXCAVATING MACHINE

Filed June 14, 1924

2 Sheets-Sheet 2

Patented June 30, 1925.

1,544,054

UNITED STATES PATENT OFFICE.

EDWIN J. ARMSTRONG, OF ERIE, PENNSYLVANIA, ASSIGNOR TO ERIE STEAM SHOVEL COMPANY, OF ERIE, PENNSYLVANIA, A CORPORATION OF PENNSYLVANIA.

EXCAVATING MACHINE.

Application filed June 14, 1924. Serial No. 720,128.

*To all whom it may concern:*

Be it known that I, EDWIN J. ARMSTRONG, a citizen of the United States, residing at Erie, in the county of Erie and State of Pennsylvania, have invented new and useful Improvements in Excavating Machines, of which the following is a specification.

It has been proposed to actuate power excavating machines by compressing air with an internal combustion engine and using the air on some of the motors of the machine. With the standard type of machine involving a turn table on which the mechanism is mounted it has been difficult to install the compressors and motors for accomplishing this purpose. The present invention is designed to simplify and provide a convenient means of mounting the parts of such mechanism for machines along the lines of the application of Arthur C Vicary, Serial Number 620,727, filed Feb. 23, 1923 and my applications, Serial Numbers 621,336 and 621,337, filed Feb. 26th, 1923.

The invention is illustrated in the accompanying drawings as follows:—

Figure 1:
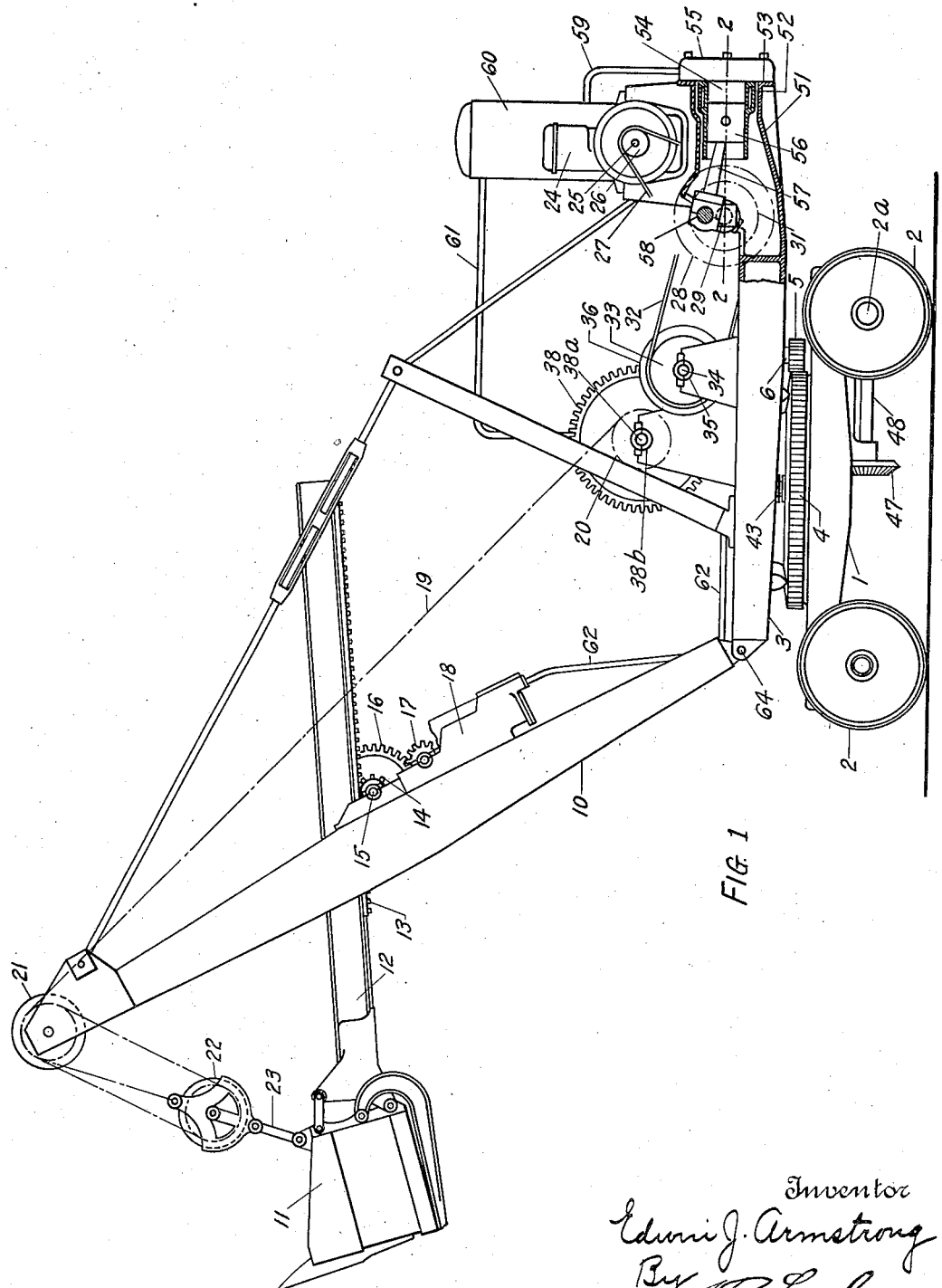

Fig. 1 shows a side elevation of the machine, partly in section.

Figure 2:
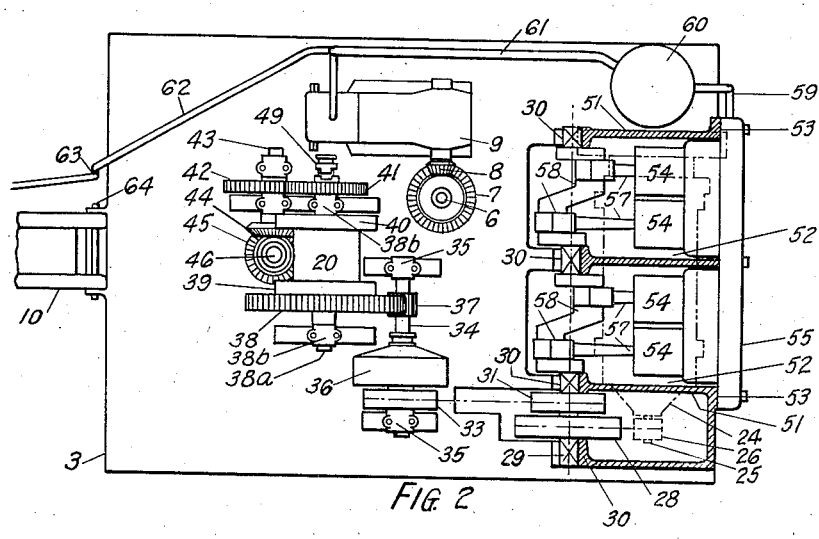

Fig. 2 a plan view of such a machine.

1 marks the truck, 2 the wheels of the truck, 3 the turning platform, 4 the gear mounted on the truck, 5 a pinion operating on the gear 4, 6 a shaft on which the pinion 5 is mounted, 7 a beveled gear mounted on the shaft 6 above the platform, 8 a beveled gear meshing with the beveled gear 7, and 9 the turning engine operating the beveled gear 8. In the present construction the turning engine is actuated by compressed air.

A boom 10 extends from the front of the machine. A dipper 11 has the usual dipper stick 12 with a rack 13. The rack 13 operates on a pinion 14. The pinion is mounted on a shaft 15. A gear 16 is also fixed on the shaft 15 and meshes with a gear 17. The gear 17 is driven direct by the crowding engine 18 mounted on the boom.

A hoisting line 19 extends from a drum 20 over a sheave 23 at the upper end of the boom and through a sheave 22. The sheave 22 is connected with the dipper by a link 23. A primary motor 24 which is of the internal combustion type has the drive or crank shaft 25 on which is mounted a pulley 26. A belt 27 extends from the pulley 26 to a pulley 28. The pulley 28 is mounted on a crank shaft 29 and this crank shaft is journaled in bearings 30 in the frame of the platform of the machine. A pulley 31 is fixed on the shaft 29. A belt 32 extends from the pulley 31 to a pulley 33. The pulley 33 is mounted on a shaft 34. The shaft 34 is mounted in bearings 35 carried by the frame. A transmission 36 is arranged on the shaft 34 and also a pinion 37. The pinion 37 meshes with a drum gear 38. The gear 38 is mounted on a shaft $38^a$ carrying the drum 20 and the shaft is mounted in bearings $38^b$. A clutch 39 is adapted to connect the gear 38 with the drum 20 and a brake 40 is provided with the drum in the usual manner. A gear 41 is mounted on the shaft $38^a$ on the opposite end of the drum 20 and meshes with a gear 42. The gear 42 is mounted on a shaft 43. A beveled gear 44 is fixed on the shaft 43 and meshes with a beveled gear 45. The beveled gear 45 is fixed on a vertical shaft 46 at the axis of the machine and extends to below the truck and drives a beveled gear 47. The beveled gear 47 drives a shaft 48 which in turn drives the driving axle $2^a$ and thus drives the machine. A clutch 49 is arranged for locking the gear 41 with the shaft $38^a$ when it is desired to move the machine. When the clutch is disengaged the clutch 39 may be operated in the usual manner for operating the drum for the hoisting line.

It will be seen from this construction that the hoisting line and traction of the machine is handled by a direct connection between the internal combustion engine and the driving members of these mechanisms whereas the turning engine and crowding engine are driven indirectly from said internal combustion motor through the air agency.

A compressor frame 51 extends from the rear of the platform. It may be formed integrally with the platform as shown but the making of it integrally with the rest of the platform depends on the convenience and facility of manufacture. It is provided with a series of cylinder receiving openings 52 which have flange securing faces 53. Cylinders 54 are formed with a head 55 which is secured to the securing faces 53, the cylinders extending into the openings 52. The pistons or plungers 56 of the compressors are arranged in the cylinders and are driven by connecting rods 57 from cranks 58 on the crank shaft 29.

It will be observed that the internal combustion engine is mounted directly on the compressor frame and directly over the compressor. This properly distributes the weight and economizes the space. The compressor cylinders are accessible from the end of the platform and the power shaft is at the most convenient position for attachment to the hoisting drum. At the same time the weight of these parts is properly distributed to operate in connection with the work of the shovel. The discharge pipe 59 of the compressor leads to a receiver 60. A pipe 61 leads from the receiver to the common turning engine 9 and an extension 62 of the pipe 61 leads to the crowding engine 18 extending through a joint 63 on a line with the axis 64 of the boom.

What I claim as new is:—

1. In an excavating machine, the combination of a turning platform; a compressor frame formed at the rear of the platform; a motor mounted over the compressor; and excavating devices driven by the fluid compressed.

2. In an excavating machine, the combination of a turning platform; a compressor frame formed at the rear of the platform; a motor mounted over the compressor and on the compressor frame; and excavating devices driven by the fluid compressed.

3. In an excavating machine, the combination of a turning platform; a compressor frame formed at the rear of the platform having openings for receiving compressor cylinders; compressors comprising compressor cylinders mounted in the openings; a motor mounted on the compressor frame driving the compressors; and excavating devices driven by the compressed fluid.

4. In an excavating machine, the combination of a turning platform; a compressor frame formed at the rear of the platform having an opening for receiving a compressor cylinder, said opening opening at the rear; a compressor comprising a cylinder secured to the rear of the platform and extending into the opening; a motor driving the compressor; and excavating devices driven by the compressed fluid.

5. In an excavating machine, the combination of a turning platform; a compressor frame formed at the rear of the platform having an opening for receiving a compressor cylinder, said opening opening at the rear; a compressor comprising a cylinder secured to the rear of the platform and extending into the opening; a motor mounted on the compressor driving the compressor; and excavating devices driven by the compressed fluid.

6. In an excavating machine, the combination of a turning table; a boom extending from the table; a dipper on the boom; a compressor frame formed at the rear of the table; a motor mounted on the compressor; and means actuating the dipper actuated by the fluid compressed.

7. In an excavating machine, the combination of a turning table; a boom extending from the table; a dipper on the boom; a compressor frame formed at the rear of the table; a motor mounted on the compressor; and means actuating the dipper comprising a crowding engine and a turning engine driven by the fluid compressed.

8. In an excavating machine, the combination of a turning table; a boom extending from the table; a dipper on the boom; a compressor frame formed at the rear of the table; a motor mounted on the compressor; means actuating the dipper comprising a hoisting drum; means directly connecting the drum with the motor; and a crowding engine driven by the fluid compressed.

9. In an excavating machine, the combination of a turning table; a boom extending from the table; a dipper on the boom; a compressor frame formed at the rear of the table; a motor mounted on the compressor; means actuating the dipper comprising a hoisting drum; means directly connecting the drum with the motor; a crowding engine; and a turning engine driven by the fluid compressed.

In testimony whereof I have hereunto set my hand.

EDWIN J. ARMSTRONG.